May 19, 1959 M. F. PHELPS 2,886,936
HARVESTER SUCTION NOZZLE WITH ANTI-CLOGGING MEANS
Filed Aug. 9, 1957 2 Sheets-Sheet 1

INVENTOR.
MORTON F. PHELPS,
BY
McMorrow, Berman + Davidson
ATTORNEYS.

May 19, 1959 M. F. PHELPS 2,886,936
HARVESTER SUCTION NOZZLE WITH ANTI-CLOGGING MEANS
Filed Aug. 9, 1957 2 Sheets-Sheet 2
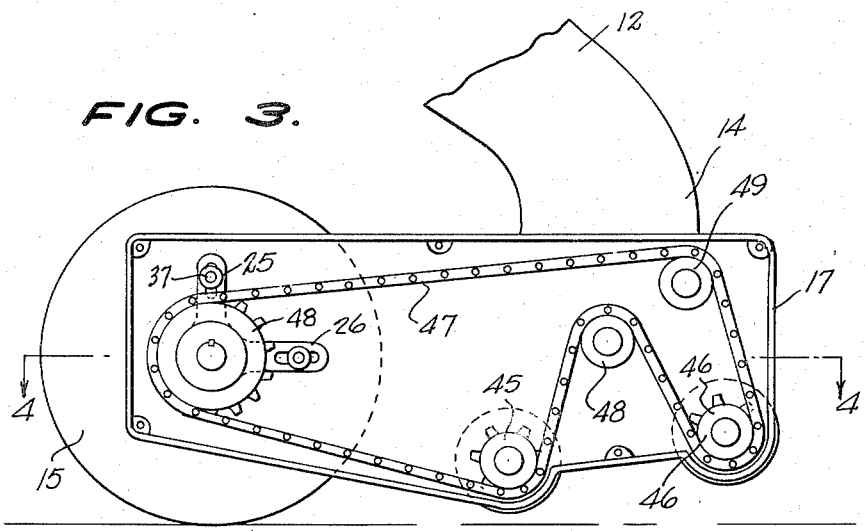
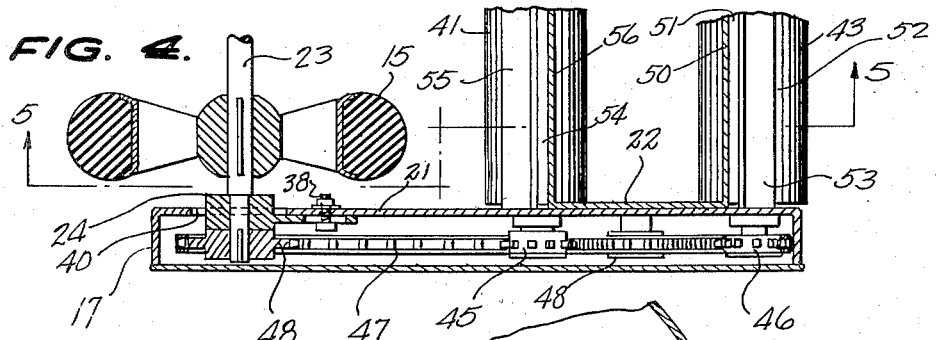
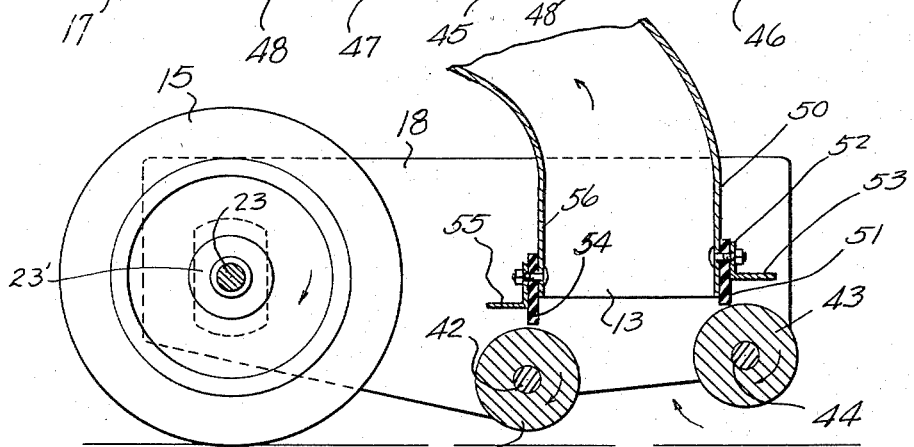
INVENTOR.
MORTON F. PHELPS,
BY
McMorrow, Berman & Davidson
ATTORNEYS.

United States Patent Office 2,886,936
Patented May 19, 1959

2,886,936

HARVESTER SUCTION NOZZLE WITH ANTI-CLOGGING MEANS

Morton F. Phelps, Little Rock, Ark.

Application August 9, 1957, Serial No. 677,300

4 Claims. (Cl. 56—328)

This invention relates to harvesters, and more particularly to a harvesting machine of the type having a suction nozzle, for example, a nut harvesting machine.

A main object of the invention is to provide a novel and improved suction nozzle for a harvesting machine, said nozzle being simple in construction, being efficient in operation, and being provided with means for preventing clogging thereof by twigs or other debris on the ground in the path of movement of the nozzle intake opening.

A further object of the invention is to provide an improved means for preventing clogging of the intake opening of the suction nozzle of a harvesting machine, said improved means involving simple components, being durable in construction, and acting to prevent trash, such as twigs or other debris from clogging the intake opening of the nozzle, whereby it is not necessary to terminate operation of the harvester in order to remove the debris by hand.

Further objects and advantages of the invention will become apparent from the following description and claims, and from the accompanying drawings, wherein:

Figure 3 is a side elevational view, taken on the line 3—3 of Figure 2;

Figure 4 is a fragmentary horizontal cross-sectional view taken on the line 4—4 of Figure 3; and Figure 5 is a vertical cross-sectional view taken on the line 5—5 of Figure 4.

Figure 1:
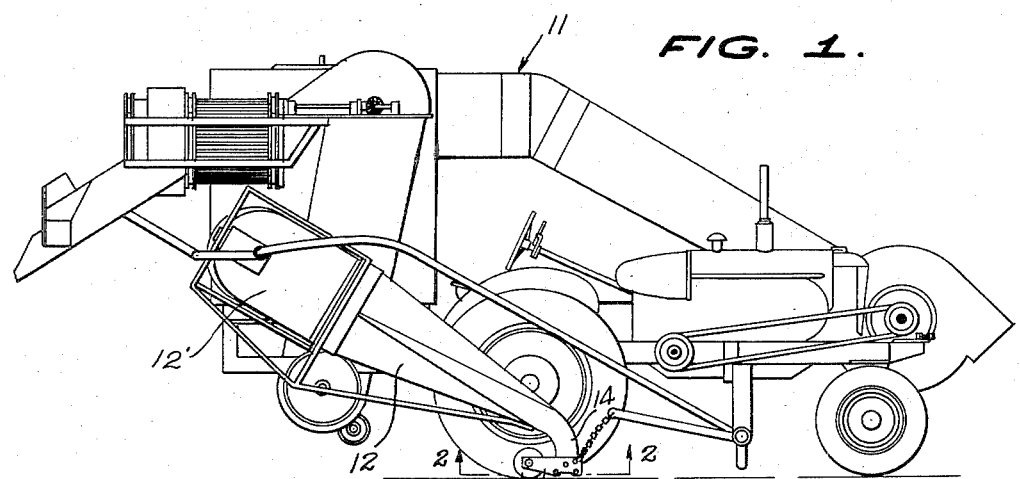
Figure 1 is a side elevational view of a nut harvesting machine provided with improved suction nozzle structure according to the present invention.
Figure 2:
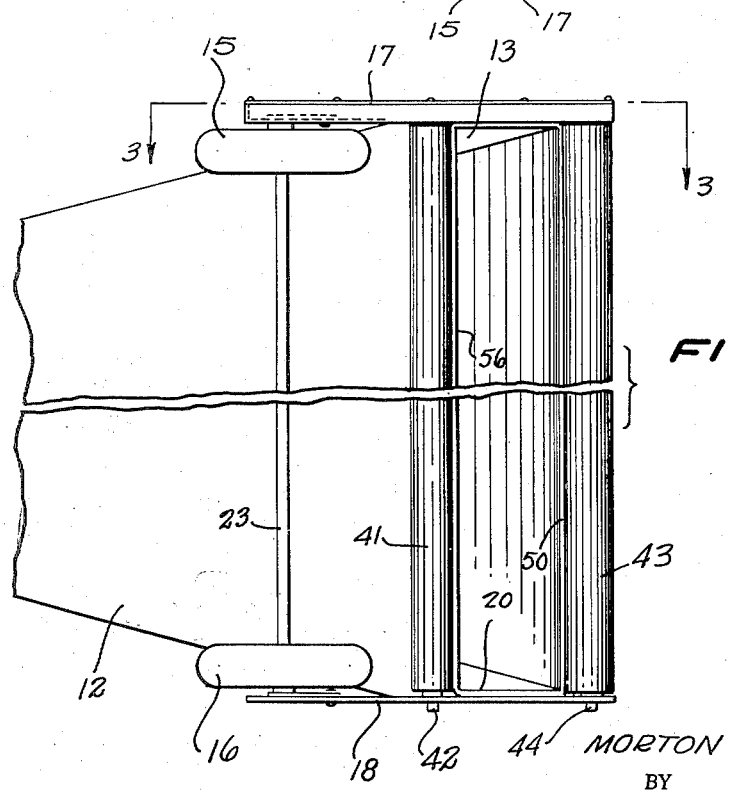
Figure 2 is an enlarged fragmentary bottom plan view of the intake portion of nozzle employed in the machine of Figure 1, said view being taken on the line 2—2 of Figure 1.

Referring to the drawings, 11 generally designates a harvesting machine adapted to gather nuts or similar small objects on the ground, the machine being of generally conventional construction and being provided with a harvesting nozzle 12 which is connected to a suction blower 12' mounted on the machine, the nozzle having a transversely extending, generally rectangular elongated bottom intake opening 13, as shown in Figure 2. The nozzle 12 is inclined downwardly and forwardly, and the forward end thereof comprises a vertical portion 14 which terminates at its bottom end in the rectangular transversely extending intake opening 13.

The forward end portion 14 of nozzle 12 is supported by a pair of ground-engaging wheels 15 and 16 journaled on the rear portions of respective bracket members 17 and 18, defining parallel vertical support members, secured to the opposite ends of the lower portion of the forward element 14 of the nozzle 12 and extending rearwardly from said element, as is clearly shown in Figure 2. The member 18 comprises a vertical plate which is secured in any suitable manner to the end wall 20 of the vertical nozzle portion 14 and which extends rearwardly therefrom. Member 17 comprises a vertical housing whose inner wall 21 is secured to the vertical end wall 22 of the nozzle portion 14, and extends a substantial distance rearwardly therefrom, as clearly shown in Figure 4. The ground-engaging wheels 15 and 16 are secured on a transversely extending axle 23, one end of the axle 23 being rotataby mounted by means of a suitable bearing 23' in the vertical plate member 18 and the other end of the axle 23 being rotatably mounted in a bearing 24 adjustably secured to the vertical wall 21 of the bracket member 17. Thus, the bearing member 24 is provided with a pair of slotted, outwardly extending radial lugs 25 and 26 through which extend clamping screws 37 and 38, said clamping screws passing through the vertical wall 21 and being provided with clamping nuts thereon to secure the clamping screws in adjusted positions in the slots of the lugs 25 and 26, whereby to fasten the bearing 24 in an adjusted position relative to the wall 21, said wall being provided with a relatively large opening 40 through which the bearing member 24 extends and in which said bearing member is adjustable.

Designated at 41 is a transverse roller which is journaled between the members 18 and 17 subjacent to the rear transverse edge of the suction nozzle discharge opening 13, said roller being secured on a supporting shaft 42 whose end portions are respectively rotatably supported in the plate 18 and the longitudinal vertical wall 21 of the housing 17. Designated at 43 is a second transverse roller which is journaled between the forward portions of the members 17 and 18, subjacent to the forward transverse edge of the nozzle intake opening 13, the roller 43 being secured on a shaft 44 which is rotatably supported respectively at its opposite ends in the plate member 18 and the vertical longitudinal wall 21 of the housing 17, the shaft 44 being located at a somewhat higher level than the shaft 42. The rollers 41 and 43 are substantially identical, so that the roller 43 is supported at a slightly higher level than the roller 41, providing a space therebeneath for a nut or similar harvested material to pass into the area subjacent to the suction nozzle intake opening 13 during the forward movement of the harvesting machine.

Secured on the end portions of shafts 42 and 44 in the housing 17 are respective sprocket wheels 45 and 46 which are engaged by a sprocket chain 47 passing around a sprocket wheel 48 secured on the end of the axle 23, as is clearly shown in Figures 3 and 4. The lower portion of the sprocket chain passes over an idler wheel 48 journaled to the longitudinal vertical wall 21 between the sprocket wheels 45 and 46 and spaced above said sprocket wheels, as shown in Figure 3, and the upper portion of the sprocket chain 47 passes over and is supported on another idler wheel 49 journaled to the wall 21 between idler 48 and sprocket wheel 46 adjacent the top wall of housing 17. Thus, the shafts 42 and 44 are drivingly coupled to the axle 23, and are thus drivingly coupled to the ground-engaging wheels 15 and 16 in a manner to be driven simultaneously therewith and in the same direction of rotation.

Secured to the forward transverse wall 50 of the nozzle end portion 14 above the roller 43 is a transversely extending vertical strip of resilient deformable material 51 whose bottom edge extends substantially into contact with the top surface of the roller 43, the strip 51 being clamped between an angle bar 52 and the lower portion of the nozzle front wall 50. The angle bar 52 has its horizontal flange 53 projecting forwardly and overlying the roller 43, as shown in Figure 5, serving as a guard means for said roller. Similarly, a vertical, transversely extending strip of resilient deformable material 54 is clamped between a rear angle bar 55 and the rear vertical wall 56 of the nozzle end portion 14, the strip 54 depending almost into contact with the top surface of the transverse roller 41, as shown in Figure 5, and the horizontal flange of the angle bar 55 projecting rearwardly and overlying the roller 41.

The depending strips 51 and 54 may be made of rubber or other similar deformable resilient material having good wearing qualities, said depending strips serving to protect the rollers 41 and 43 from becoming jammed or clogged by twigs or similar debris. The horizontal flanges of the angle bars 52 and 55 also serve as protective means to prevent the rollers from becoming jammed by twigs or other debris.

In operation, as the harvesting machine moves forwardly, the nuts or other objects to be harvested pass beneath the forward roller 43 and are urged into the intake opening 13 by the suction of the nozzle member 12. Any twigs or other elongated trash objects urged against and contacting the rollers by the suction will be rolled off by the revolving action of the rollers. As will be readily apparent, an elongated trash object such as a twig or the like normally will be oriented in a random manner such that it will simultaneously contact both rollers 44 and 41. The simultaneous action of both rollers will move the twig rearwardly past the intake opening 13 and will not allow the twig to enter said intake opening. The depending deformable resilient strips 51 and 54 will not only serve as clearing means for the rollers but also serve to substantially seal the rollers with respect to the lower transverse edges of the intake opening 13, whereby to develop suction between the rollers, and particularly beneath the forward roller 43 which is supported above ground level by the rear roller 41. As shown in Figure 5, both rollers 43 and 41 rotate clockwise, as viewed in Figure 5, namely, in the same direction as the ground-engaging wheels 15 and 16, and should any twigs or other elongated debris occupy the space between the rollers 43 and 41, the rear roller 41 will engage and urge such twigs or debris rearwardly before the debris can pass upwardly into the opening 13 and prevent the debris from clogging the space between the rollers. Because the rollers rotate continuously as long as the machine is in operation and is moving forwardly, such twigs or debris cannot collect beneath the intake opening 13 of the nozzle and are automatically cleared away from said opening, allowing the intake opening to be efficiently employed at all times to allow nuts or other small objects to be harvested from the ground to pass into the nozzle.

The tension of the sprocket chain 47 may be readily adjusted by adjusting the bearing member 24 in the opening 40 of the longitudinal vertical wall 21 of the housing 17, in the manner above described. The same adjustment employed for tightening the chain is also used for adjusting the ground-engaging wheels 15 and 16 so that they will support the rollers 41 and 43 at a desired distance above the ground. The adjustment of the ground-engaging wheels 15 and 16 is especially important where the ground is relatively soft.

The rollers may be driven directly from the engine of the harvesting means, if so desired, instead of being coupled to the ground-engaging wheels 15 and 16.

While a specific embodiment of an improved harvesting nozzle structure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a harvesting machine of the character described, a harvesting nozzle adapted to be connected to a suction blower on the machine, said nozzle having a transversely extending elongated bottom intake opening large enough to receive nuts and similar small objects, parallel vertical support members secured to the nozzle at the opposite ends of said intake opening respective ground-engaging wheels journaled to said support members at one side of said intake opening, a first roller journaled between said support members subjacent and parallel to the transverse edge of said intake opening nearest the ground-engaging wheels, said first roller being above ground level, a second roller journaled between said support members subjacent and parallel to the other transverse edge of said intake opening, the first roller being located at a lower level than the second roller and means rotating said rollers in the same direction and in a direction to move elongated trash material simultaneously encountered thereby toward said ground-engaging wheels.

2. In a harvesting machine of the character described, a harvesting nozzle adapted to be connected to a suction blower on the machine, said nozzle having a transversely extending elongated bottom intake opening large enough to receive nuts and similar small objects, parallel vertical support members secured to the nozzle at the opposite ends of said intake opening respective ground-engaging wheels journaled to said support members at one side of said intake opening, a first roller journaled between said support members subjacent and parallel to the transverse edge of said intake opening nearest the ground-engaging wheels, said first roller being above ground level, a second roller journaled between said support members subjacent and parallel to the other transverse edge of said intake opening, the first roller being located at a lower level than the second roller, and means drivingly coupling said rollers to said ground-engaging wheels for rotation, whereby to move elongated trash material simultaneously encountered by the rollers in the direction of said ground-engaging wheels.

3. In a harvesting machine of the character described, a downwardly and forwardly extending harvesting nozzle adapted to be connected to a suction blower on the machine, said nozzle having a transversely extending elongated bottom intake opening large enough to receive nuts and similar small objects parallel vertical support members secured to the nozzle at the opposite ends of said intake opening, respective ground-engaging wheels journaled to said support members and being spaced rearwardly of said intake opening, a first roller journaled between said support members subjacent and parallel to the rear transverse edge of said intake opening, said first roller being above ground level, a second roller journaled between said support members subjacent and parallel to the forward transverse edge of said intake opening, the first roller being located at a lower level than the second roller, respective depending transverse strips of deformable resilient material secured to the rear and forward edges of said intake opening and extending substantially to the top surface of the associated rollers, and means drivingly coupling said rollers to said ground-engaging wheels for rotation simultaneously therewith and in the same direction, whereby to move elongated trash material simultaneously encountered by the rollers in the direction of said ground-engaging wheels.

4. In a harvesting machine of the character described, a downwardly and forwardly extending harvesting nozzle adapted to be connected to a suction blower on the machine, said nozzle having a transversely extending elongated bottom intake opening large enough to receive nuts and similar small objects parallel vertical support members secured to the nozzle at the opposite ends of said intake opening, respective ground-engaging wheels journaled to said support members and being spaced rearwardly of said intake opening, a first roller journaled between said support members subjacent and parallel to the rear transverse edge of said intake opening, said first roller being above ground level, a second roller journaled between said support members subjacent and parallel to the forward transverse edge of said intake opening, the first roller being located at a lower level than the second roller, respective depending transverse strips of deformable resilient material secured to the rear and forward edges of said intake opening and extending substantially to the top surface of the associated rollers, and means simultaneously rotating said rollers in the same direction, whereby to move elongated trash material simultaneously encountered by the rollers in the direction of said ground-engaging wheels.

References Cited in the file of this patent

UNITED STATES PATENTS

| | | |
|---|---|---|
| 1,043,024 | Moorhead | Oct. 29, 1912 |
| 2,697,320 | Aguilar | Dec. 21, 1954 |
| 2,781,625 | Phelps et al. | Feb. 19, 1957 |
| 2,789,408 | Bloxham | Apr. 23, 1957 |
| 2,807,128 | Helfrich | Sept. 24, 1957 |

FOREIGN PATENTS

| | | |
|---|---|---|
| 15,314 | Denmark | Nov. 13, 1911 |